United States Patent
Wu et al.

(10) Patent No.: US 12,473,106 B2
(45) Date of Patent: Nov. 18, 2025

(54) UNMANNED VEHICLE

(71) Applicant: Qisda Corporation, Taoyuan (TW)

(72) Inventors: Po-Fu Wu, Taoyuan (TW); Chih-Ming Chang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/748,112

(22) Filed: Jun. 20, 2024

(65) Prior Publication Data

US 2025/0019100 A1    Jan. 16, 2025

(30) Foreign Application Priority Data

Jul. 14, 2023    (CN) .......................... 202310866587.3

(51) Int. Cl.
    *B64U 50/39*    (2023.01)
    *B64U 50/37*    (2023.01)

(52) U.S. Cl.
    CPC .............. *B64U 50/39* (2023.01); *B64U 50/37* (2023.01)

(58) Field of Classification Search
    CPC ......... B64U 50/39; B64U 50/37; B64U 50/30
    See application file for complete search history.

(56) References Cited

U.S. PATENT DOCUMENTS

2024/0425177 A1*  12/2024  File .................. B64D 31/09

FOREIGN PATENT DOCUMENTS

| CN | 108341051 | 1/2022 |
| CN | 115009101 | 9/2022 |

* cited by examiner

*Primary Examiner* — Justin M Benedik

(57) ABSTRACT

An unmanned vehicle includes a body and a plurality of battery packs. The battery packs are detachably stacked on the body, wherein the body sequentially uses the power of the battery packs in an anti-gravity direction.

20 Claims, 11 Drawing Sheets

UNMANNED VEHICLE

CROSS-REFERENCE TO RELATED APPLICATION

This application claims the priority benefit of Chinese application no. 202310866587.3, filed on Jul. 14, 2023. The entirety of the above-mentioned patent application is hereby incorporated by reference herein and made a part of this specification.

BACKGROUND

Technical Field

The disclosure relates to a vehicle, and more particularly, to an unmanned vehicle.

Description of Related Art

Traditional drone batteries are divided into large batteries and small batteries based on the size of the battery capacity. Large batteries have the advantages of large battery capacity and long endurance, but have the disadvantages of heavy weight and slow flight speed. Small batteries have the advantages of being lightweight and flying fast, but have the disadvantages of small battery capacity and short endurance. Regarding the use of batteries, users will decide the size of the battery to be installed for that flight based on actual needs. Because the advantages and disadvantages of large and small batteries in drones are mutually exclusive, designers have a difficult time choosing between them.

SUMMARY

The disclosure provides an unmanned vehicle that can combine the advantages of a large battery and a small battery.

The unmanned vehicle of the disclosure includes a body and a plurality of battery packs. The battery packs are detachably stacked on the body, wherein the body sequentially uses a power of the battery packs in an anti-gravity direction.

In an embodiment of the disclosure, the battery packs are stacked on the body in an electromagnetically attractive manner, and at least one of the battery packs is unloaded from the body in a demagnetizing manner.

In an embodiment of the disclosure, each of the battery packs has a first surface and a second surface opposite each other. Each of the battery packs includes an electromagnet pack and a magnetic structure pack. The electromagnet pack is disposed on the first surface, and the magnetic structure pack is disposed on the second surface.

In an embodiment of the disclosure, each of the battery packs further includes a battery management module electrically connected to the electromagnet pack to activate or deactivate a magnetism of the electromagnet pack.

In an embodiment of the disclosure, the battery management module of one of the battery packs activates the magnetism of the electromagnet pack to electromagnetically attract the magnetic structure pack of another of the battery packs and is stacked on the body.

In an embodiment of the disclosure, the battery management module of one of the battery packs turns off the magnetism of the electromagnet pack to demagnetize the magnetic structure pack of another of the battery packs and is unloaded from the body.

In an embodiment of the disclosure, the magnetic structure pack includes a plurality of magnets or a plurality of iron sheets.

In an embodiment of the disclosure, when the unmanned vehicle is in a desired charged state, a first battery pack of the battery packs stacked on the body and furthest away from the body is unloaded to expose a second battery pack, and the second battery pack is recharged by electromagnetically attracting at least one supplementary battery pack on a ground charging station to be stacked thereon.

In an embodiment of the disclosure, when the unmanned vehicle is in a desired charged state, a battery pack of the battery packs stacked on the body and furthest away from the body is recharged by electromagnetically attracting at least one supplementary battery pack on a ground charging station to be stacked thereon.

In an embodiment of the disclosure, when a power of the at least one supplementary battery pack is greater than a power of the battery pack, the at least one supplementary battery pack charges the battery pack.

In an embodiment of the disclosure, when the unmanned vehicle is in a desired charged state, a first battery pack of the battery packs stacked on the body and furthest away from the body is unloaded to expose a second battery pack, and the second battery pack is recharged by electromagnetically attracting at least one supplementary battery pack on an aerial charging station to be stacked thereon.

In an embodiment of the disclosure, when the unmanned vehicle is in a desired charged state, a battery pack of the battery packs stacked on the body and furthest away from the body is recharged by electromagnetically attracting at least one supplementary battery pack on an aerial charging station to be stacked thereon.

In an embodiment of the disclosure, when a power of the at least one supplementary battery pack is greater than a power of the battery pack, the at least one supplementary battery pack charges the battery pack.

In an embodiment of the disclosure, when the unmanned vehicle is in an emergency state, the at least one battery pack of the battery packs is unloaded from the body in a demagnetized manner.

In an embodiment of the disclosure, each of the battery packs has an assembly surface, and one of the battery packs is stacked on another of the battery packs in a manner parallel to the assembly surface.

In an embodiment of the disclosure, the battery packs have the same specifications.

In an embodiment of the disclosure, each of the battery packs has a plurality of contacts, and the contacts of one of the battery packs are electrically connected to the contacts of another of the battery packs.

In an embodiment of the disclosure, the battery packs include a first battery pack and at least one second battery pack. The first battery pack is assembled on the body, and the at least one second battery pack is detachably stacked on the first battery pack.

In an embodiment of the disclosure, the first battery pack includes a built-in battery pack, and the at least one second battery pack includes at least one disposable battery pack.

In an embodiment of the disclosure, each of the battery packs includes a disposable battery pack.

Based on the above, in the design of the unmanned vehicle of the disclosure, the battery packs are detachably stacked on the body, and the body sequentially uses the power of the battery packs in the anti-gravity direction. Therefore, when the unmanned vehicle takes off, multiple battery packs can be installed, which has the advantage of large battery capacity and long endurance of large battery; on the other hand, since the bottom battery pack can be utilized first, the battery pack that has exhausted its power can be unloaded, which has the advantages of light weight and fast flight speed of the small battery. In short, the unmanned vehicle of the disclosure can combine the advantages of both the large battery and the small battery.

In order to make the aforementioned features and advantages of the disclosure comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
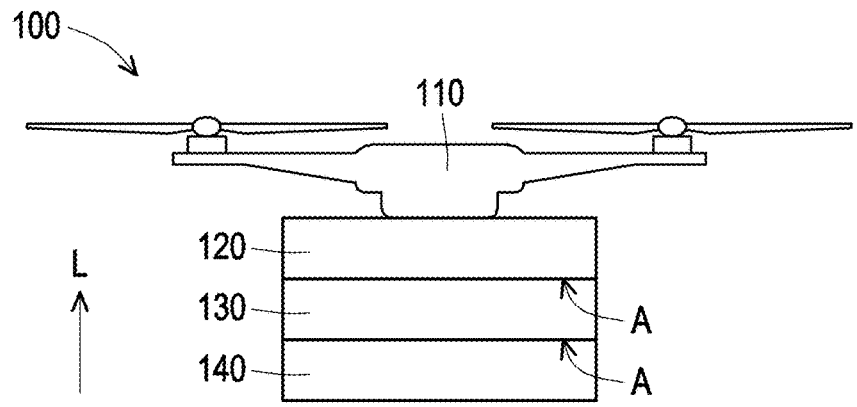
FIG. 1A is a schematic diagram of an unmanned vehicle according to an embodiment of the disclosure.
Figure 1B:
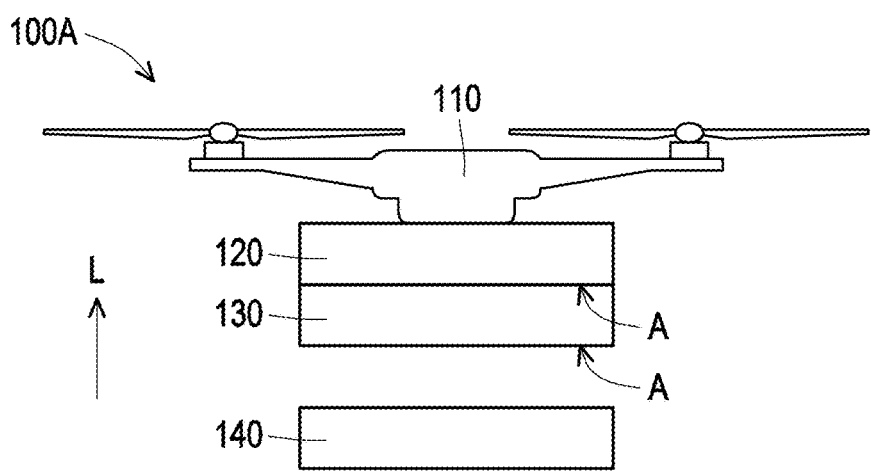
FIG. 1B is a schematic diagram of one of the battery packs in FIG. 1A being unloaded from the body.
Figure 1C:
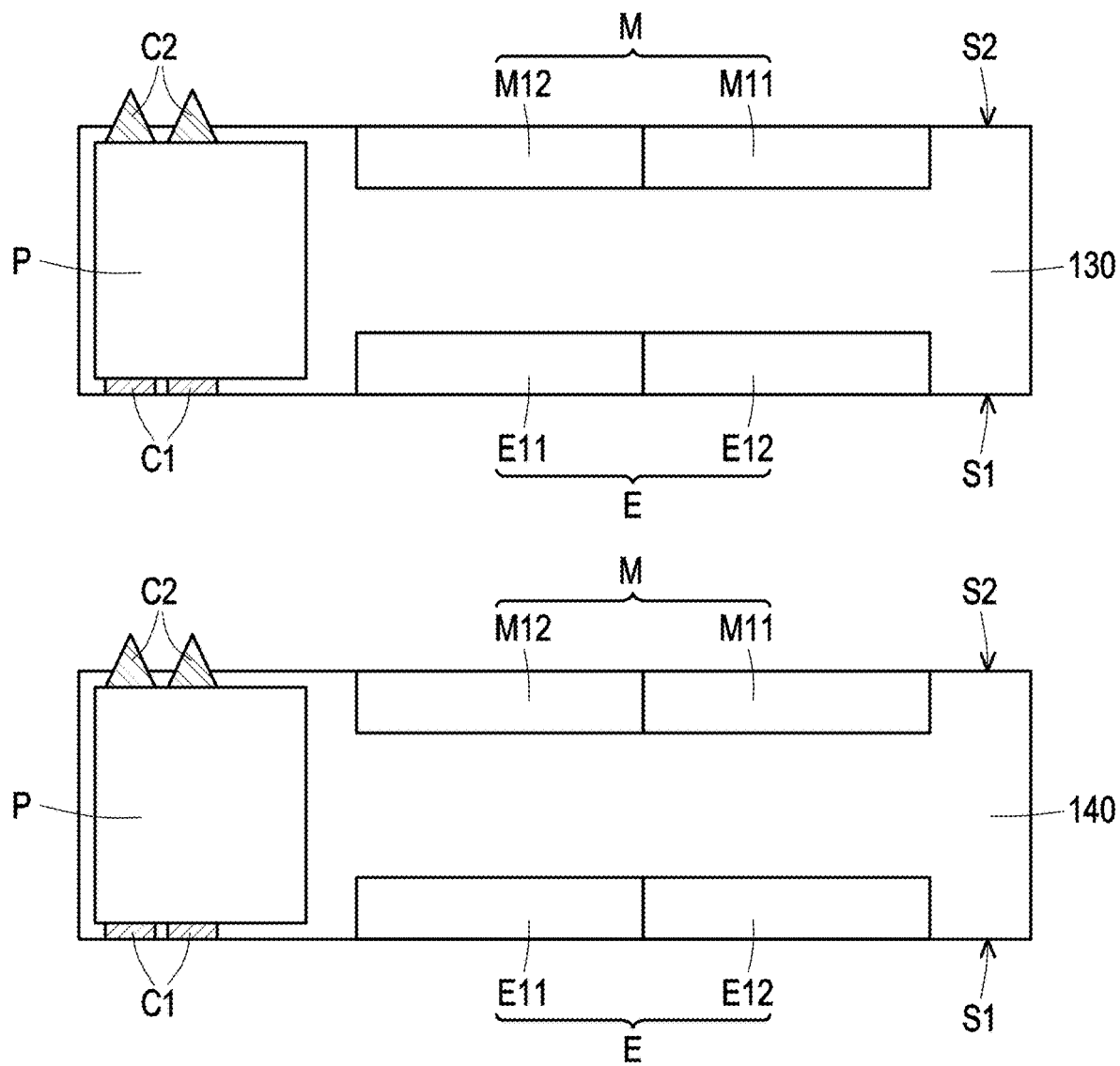
FIG. 1C is an enlarged schematic diagram of the two battery packs of FIG. 1A.

FIG. 1A is a schematic diagram of an unmanned vehicle according to an embodiment of the disclosure. FIG. 1B is a schematic diagram of one of the battery packs in FIG. 1A being unloaded from the body. FIG. 1C is an enlarged schematic diagram of the two battery packs of FIG. 1A. Please refer to FIG. 1A first. In this embodiment, the unmanned vehicle 100 includes a body 110 and a plurality of battery packs (schematically shown three battery packs 120, 130, and 140). The battery packs 120, 130, and 140 are detachably stacked on the body 110, wherein the body 110 sequentially uses the power of the battery packs 120, 130, and 140 in an anti-gravity direction L. Herein, the unmanned vehicle 100 is, for example, a drone.

Specifically, each battery pack 120, 130, and 140 has an assembly surface A, wherein the battery pack 140 is stacked on the battery pack 130 in a manner parallel to the assembly surface A (i.e., horizontal direction), and the battery pack 130 is stacked on the battery pack 120 in a manner parallel to the assembly surface A. In one embodiment, the battery pack 120 is assembled on the body 110, and the battery packs 130 and 140 are detachably stacked on the battery pack 120, wherein the battery pack 120 may be, for example, a built-in battery pack, and the battery packs 130 and 140 may be, for example, disposable battery packs. In another embodiment, the battery packs 120, 130, and 140 are all disposable battery packs. It should be noted that three horizontally stacked battery packs 120, 130, and 140 are used as an example here, but this is not a limitation. In other embodiments, the number of battery pack may be loaded or unloaded according to actual usage requirements.

Since the battery packs 120, 130, and 140 are installed in a horizontally stacked manner, multiple battery packs 120, 130, and 140 can be installed when the unmanned vehicle 100 takes off to expand the battery capacity, which can have the advantage of large battery capacity and long endurance of large battery. In one embodiment, battery packs 120, 130, and 140 may have the same specifications, where the specifications include battery capacity, appearance size, and structural design, but are not limited thereto.

Next, please refer to FIG. 1A and FIG. 1B at the same time. In this embodiment, the body 110 of the unmanned vehicle 100 sequentially uses the power of the battery packs 120, 130, and 140 in the anti-gravity direction L, which means that the body 110 is sequentially using power from the battery pack 140, the battery pack 130 and the battery pack 120. Therefore, the battery pack 140 at the bottom will be exhausted first, and the exhausted battery pack 140 can be unloaded at an appropriate location or height to reduce weight and form an unmanned vehicle 100A. At this time, the weight of the unmanned vehicle 100A is reduced, the flight efficiency is improved, and the flexibility is high, so that it can have the advantages of light weight and fast flight speed of the small battery.

Since the battery packs 120, 130, and 140 are installed in the horizontally stacked manner, the unmanned vehicles 100 and 100A will not experience a shift in the center of gravity that could cause a loss of balance when loading or unloading the battery packs 120, 130, and 140.

Next, please refer to FIG. 1A, FIG. 1B and FIG. 1C at the same time. In this embodiment, the battery packs 120, 130, and 140 are stacked on the body 110 in an electromagnetically attractive manner, and the battery pack 140 of the battery packs 120, 130, and 140 is unloaded from the body 110 in a demagnetizing manner. Herein, electromagnetically attractive (i.e. excitation) means that current is excited through the coil to generate a magnetic field. Furthermore, each battery pack 130 (or the battery pack 140, or the battery pack 120) has a first surface S1 and a second surface S2 opposite to each other, and each battery pack 130 (or battery pack 140, or the battery pack 120) includes an electromagnet pack E and a magnetic structure pack M. The electromagnet pack E is disposed on the first surface S1, and the magnetic structure pack M is disposed on the second surface S2. The electromagnet pack E includes an electromagnet N pole E11 and an electromagnet S pole E12, and the magnetic structure pack M includes a magnetic structure N pole M11 and a magnetic structure S pole M12. The electromagnet N pole E11 is disposed opposite to the magnetic structure S pole M12, and the electromagnet S pole E12 is disposed opposite to the magnetic structure N pole M11. In one embodiment, the magnetic structure pack M is, for example, a plurality of magnets or a plurality of iron sheets, but is not limited thereto.

Furthermore, each battery pack 130 (or battery pack 140, or the battery pack 120) also includes a battery management module P that is electrically connected to the electromagnet pack E to activate or deactivate a magnetism of the electromagnet pack E. Herein, each battery management module P can correspondingly control whether the energy output of the battery pack 120 (or battery pack 130, or the battery pack 140), the switch of the electromagnet group E, the battery pack 120 (or battery pack 130, or the battery pack 140) power detection and data transmission functions of the flight control computer of the unmanned vehicle 100 (or the unmanned vehicle 100A), wherein the flight control computer can decide to load or unload the battery pack and which battery pack should provide power. In other words, by controlling the switching of the electromagnet pack E inside each battery pack 120 (or battery pack 130, or battery pack 140), the function of unloading or loading the battery pack can be achieved. In addition, each battery pack 130 (or battery pack 140, or the battery pack 120) has a plurality of connectors C1 and C2, wherein the connector C1 is located on the first surface S1 and the connector C2 is located on the second surface S2. When stacked, the connector C1 of the battery pack 130 can be electrically connected to the connector C2 of the battery pack 140 to achieve the connection of electrical and communication functions.

For example, the battery management module P of the battery pack 130 activates the magnetism of the electromagnet pack E to electromagnetically attract the magnetic structure pack M of the battery pack 140 and is stacked on the body 110. At this time, the electromagnet N pole E11 of the battery pack 130 is electromagnetically attracted to the magnetic structure S pole M12 of the battery pack 140, and the electromagnet S pole E12 of the battery pack 130 is electromagnetically attracted to the magnetic structure N pole M11 of the battery pack 140, resulting in stacking of the battery pack 140 on the battery pack 130. On the other hand, the battery management module P of the battery pack 130 turns off the magnetism of the electromagnet pack E to demagnetize the magnetic structure pack M of the battery pack 140 and is unloaded from the body 110. In short, the stacked battery packs 120, 130, and 140 activate or deactivate the magnetism of the electromagnet pack E through the battery management module P. There is no need to rely on a positioner, and the battery packs 120, 130, and 140 can be positioned through magnetism.

Figure 2A:
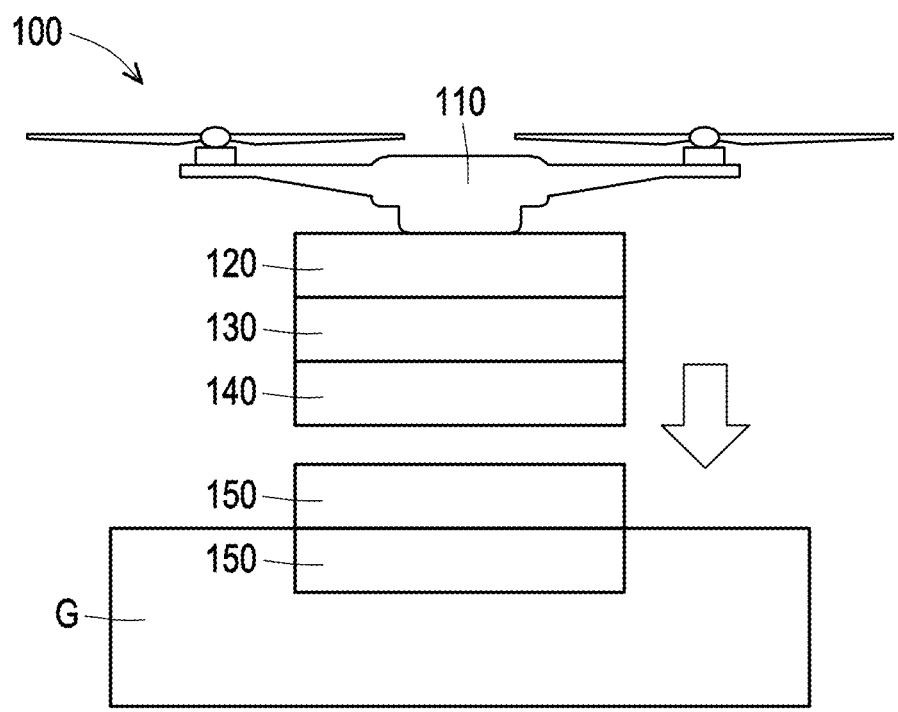
FIGS. 2A and 2B are schematic diagrams of the unmanned vehicle in FIG. 1A during charging.
Figure 2B:
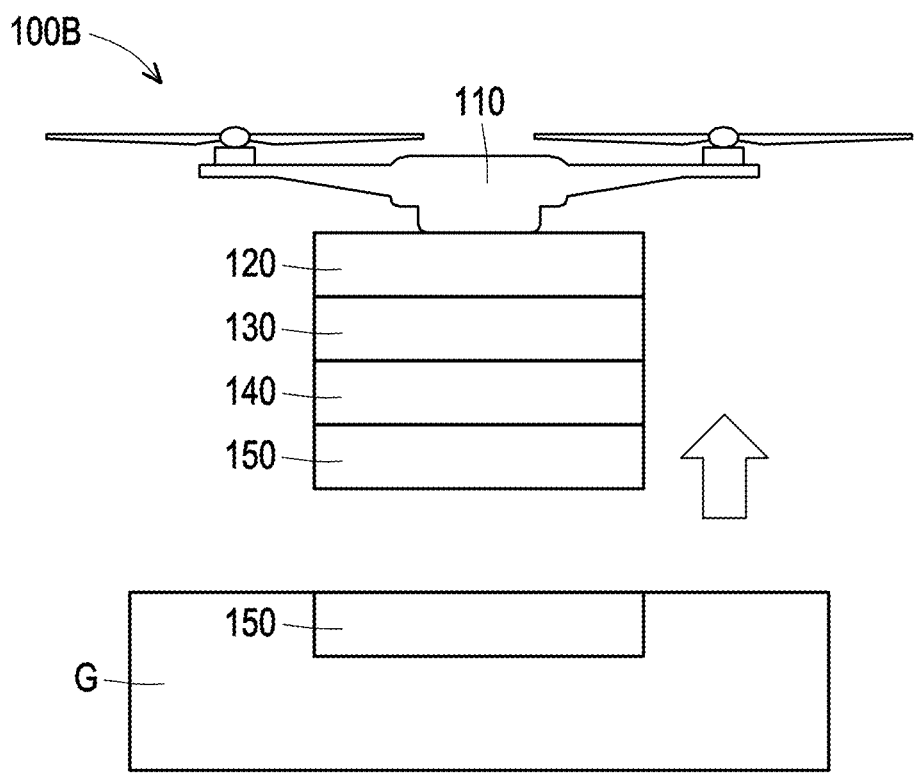

FIGS. 2A and 2B are schematic diagrams of the unmanned vehicle in FIG. 1A during charging. Please refer to FIG. 2A and FIG. 2B at the same time. When the unmanned vehicle 100 is in a desired charging state, the battery pack 140 stacked on the body 110 and furthest away from the body 110 is recharged by electromagnetically attracting at least one supplementary battery pack 150 on a ground charging station G to be stacked thereon, thereby forming an unmanned vehicle 100B having the battery packs 120, 130, 140 and the supplementary battery pack 150. Herein, the ground charging station G can place the fully charged supplementary battery pack 150 at a designated location. The unmanned vehicle 100 will fly downward first, so that the battery pack 140 and the supplementary battery pack 150 on the ground charging station G are electromagnetically attracted to each other to form the unmanned vehicle 100B, and then fly upward away from the ground charging station G. In one embodiment, the unmanned vehicle 100 can load one or more supplementary battery packs 150 through one landing, or one landing and load one supplementary battery pack 150, or multiple landings to load multiple supplementary battery packs 150, depending on demand and without limitation herein. In short, the purpose of long-distance flight can be achieved by first setting up multiple ground charging stations G on the flight path.

Furthermore, when the power of the supplementary battery pack 150 is greater than the power of the battery pack 140, the supplementary battery pack 150 can charge the battery pack 140 (or battery pack 130, or battery pack 120), which is an upward recharging mechanism. Furthermore, after the battery pack 140 has been loaded and replenished, the body 110 will not only use the power of the supplementary battery pack 150 first, but the supplementary battery pack 150 will also recharge the battery pack 140 above that is not fully charged (or the battery pack 130, or the battery pack 120), so that the power of the battery packs 120, 130, 140 and the supplementary battery pack 150 will always conform to the battery pack 120≥the battery pack 130≥the battery pack 140≥the supplementary battery pack 150. The upward recharging mechanism ensures that the bottom battery pack is depleted more quickly and the bottom battery pack is disposed of as soon as possible, resulting in weight reduction. In addition, through the upward recharging mechanism, there will be no accidents in which the upper battery pack (such as the battery pack 140) exhausts the capacity of the battery pack (such as the battery pack 140) due to the need to maintain the attraction of the electromagnet, causing the entire series of stacked battery packs (such as the battery packs 120, 130, 140) to dislodge.

Figure 3A:
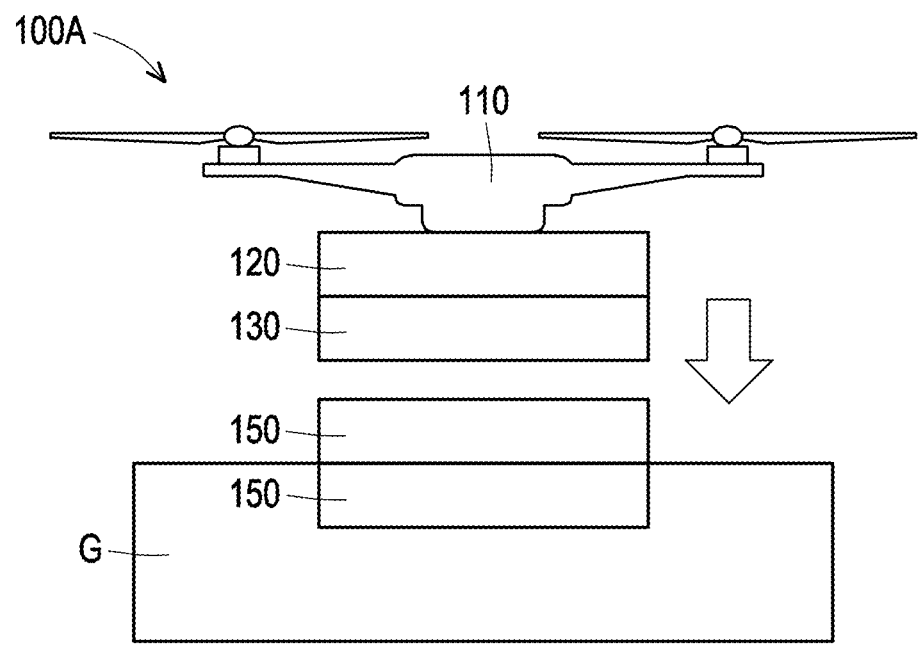
FIGS. 3A and 3B are schematic diagrams of the unmanned vehicle in FIG. 1B during charging.
Figure 3B:
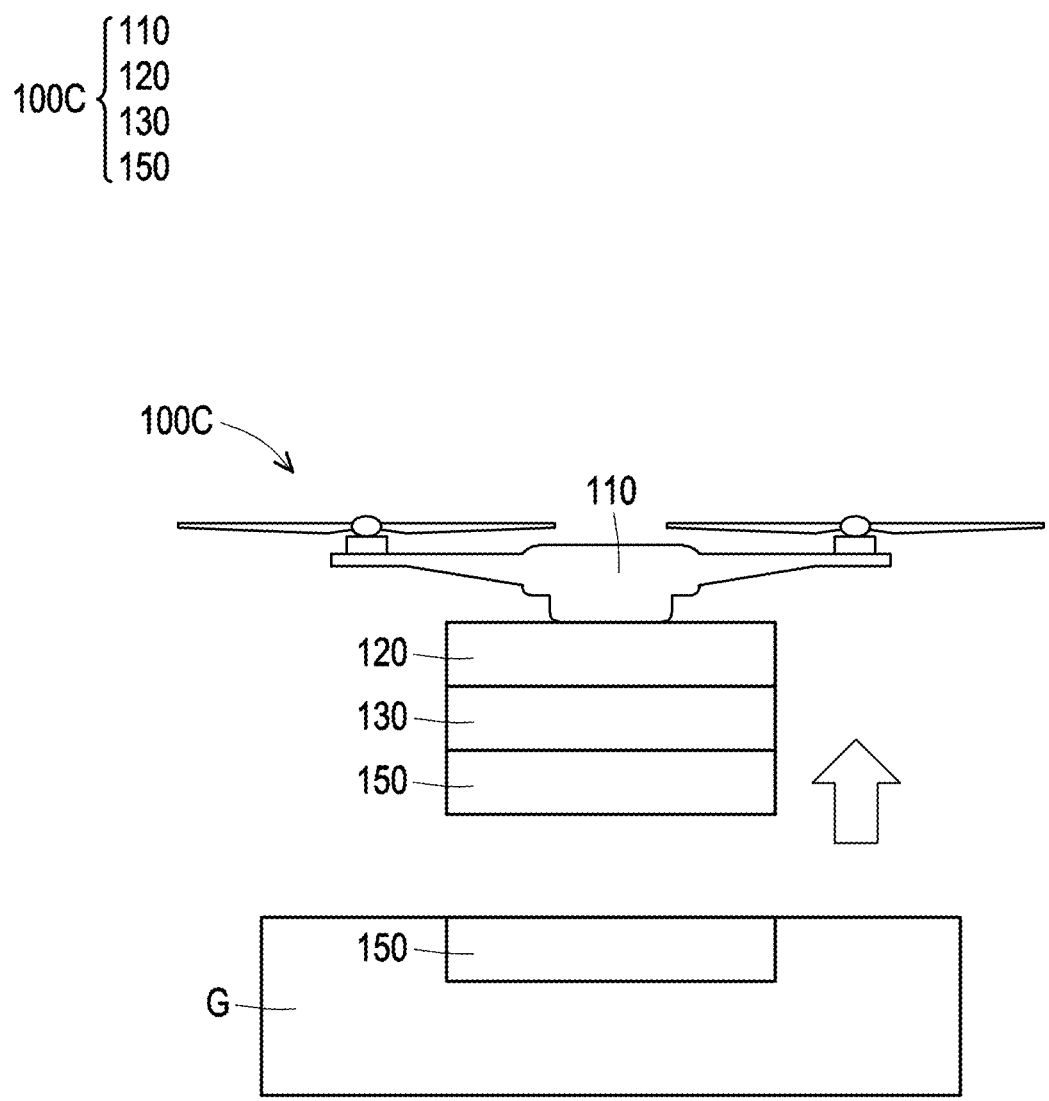

FIGS. 3A and 3B are schematic diagrams of the unmanned vehicle in FIG. 1B during charging. Please refer to FIG. 1B, FIG. 3A and FIG. 3B at the same time. When the unmanned vehicle 100A is in a desired charging state, the battery pack 140 stacked on the body 110 and furthest away from the body 110 can be unloaded first to expose the battery pack 130. The battery pack 130 is recharged by electromagnetically attracting at least one supplementary battery pack 150 on a ground charging station G to be stacked thereon, thereby forming an unmanned vehicle 100C having the battery packs 120, 130 and the supplementary battery pack 150. In other words, the unmanned vehicle 100A first unloads the low-power or exhausted battery pack 140 below, and then leads on the ground charging station G, so that the battery pack 130 and the supplementary battery pack 150 on the ground charging station G are electromagnetically attracted to each other to form the unmanned vehicle 100C, and then fly upward away from the ground charging station G, which can achieve the effect of being unloaded as quickly as possible and reducing weight. In one embodiment, the unmanned vehicle 100A can load one or more supplementary battery packs 150 through one landing, or one landing and load one supplementary battery pack 150, or multiple landings to load multiple supplementary battery packs 150, depending on demand and without limitation herein.

Furthermore, when the power of the supplementary battery pack 150 is greater than the power of the battery pack 130, the supplementary battery pack 150 can charge the battery pack 130 (or the battery pack 120). Furthermore, after the battery pack 130 has been loaded and replenished, the body 110 will not only use the power of the supplementary battery pack 150 first, but the supplementary battery pack 150 will also recharge the battery pack 130 above that is not fully charged (or the battery pack 120), so that the power of the battery packs 120, 130 and supplementary battery pack 150 will always conform the battery pack 120≥the battery pack 130≥the supplementary battery pack 150.

Figure 4A:
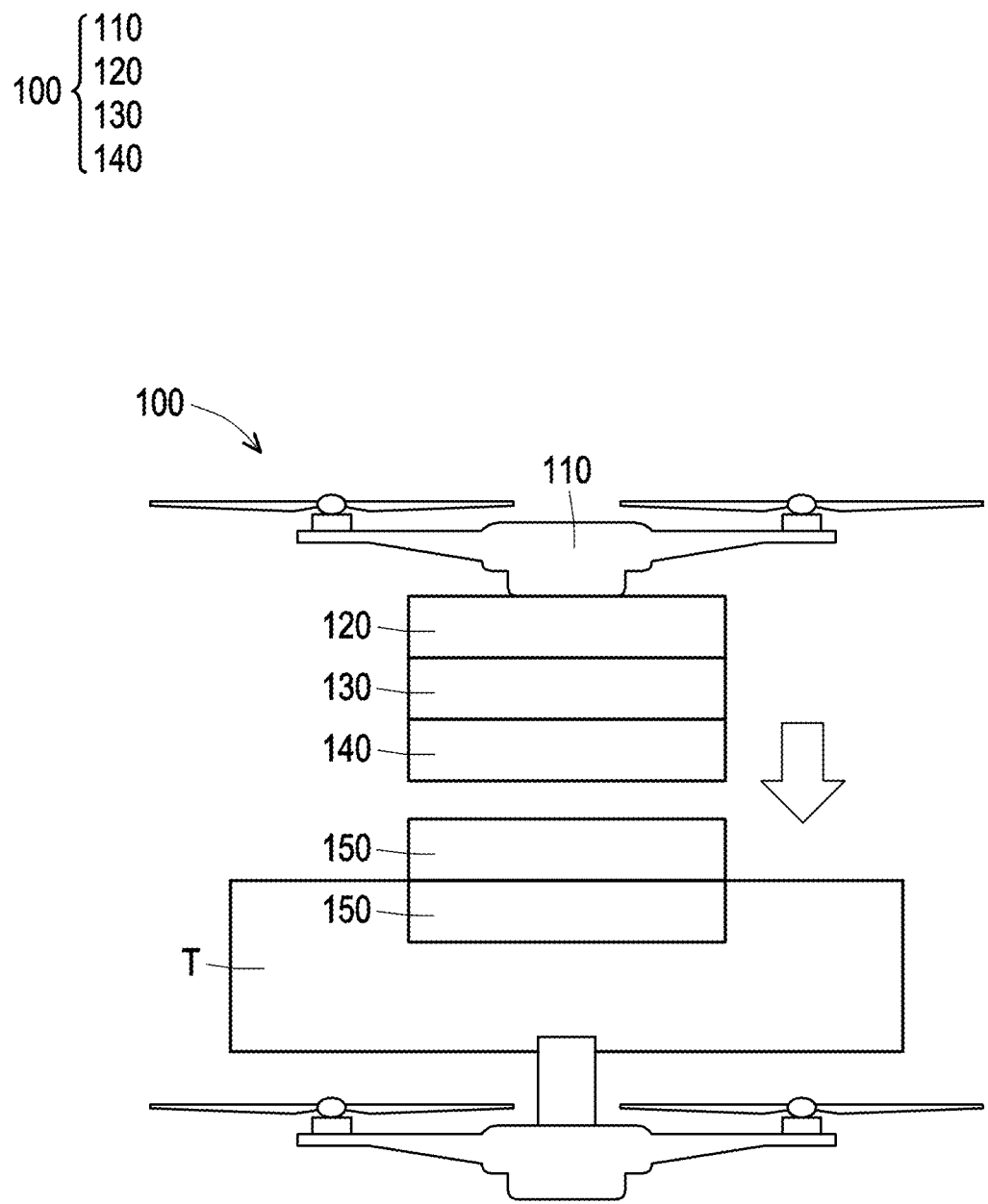
FIGS. 4A and 4B are another schematic diagram of the unmanned vehicle in FIG. 1A during charging.
Figure 4B:
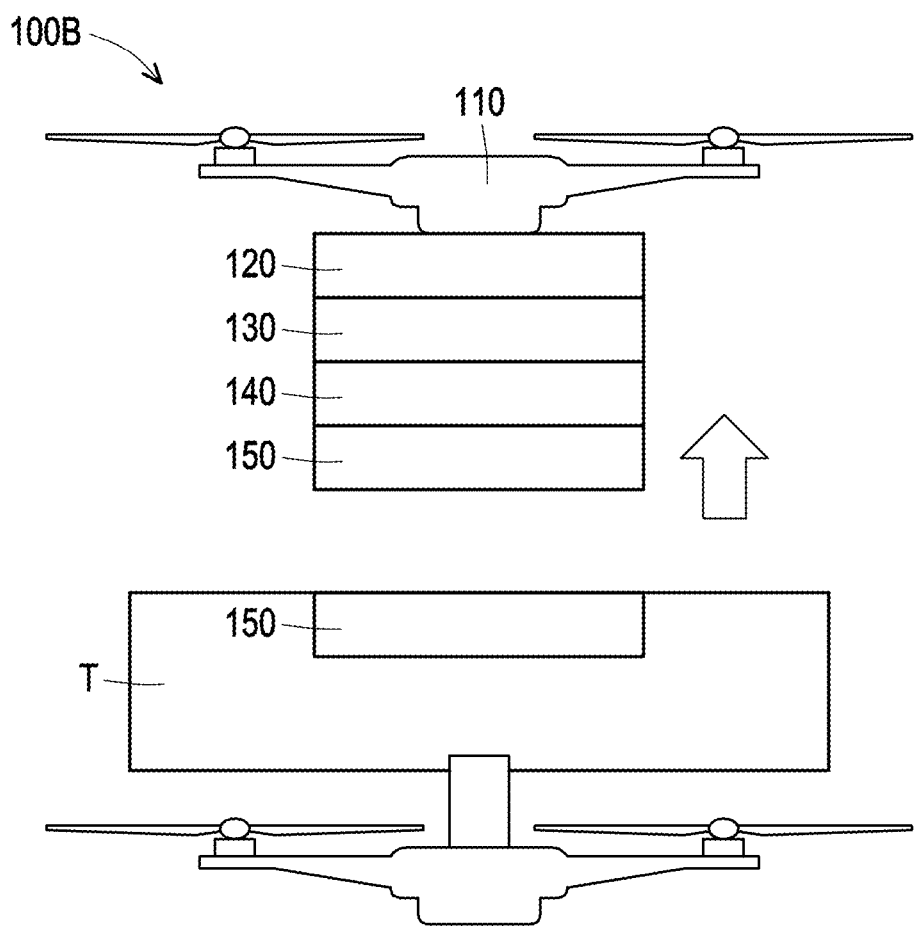

FIGS. 4A and 4B are another schematic diagram of the unmanned vehicle in FIG. 1A during charging. Please refer to FIG. 4A and FIG. 4B at the same time. When the unmanned vehicle 100 is in a desired charging state, the battery pack 140 stacked on the body 110 and furthest away from the body 110 is recharged by electromagnetically attracting at least one supplementary battery pack 150 on an aerial charging station T to be stacked thereon, thereby forming an unmanned vehicle 100B having the battery packs 120, 130, 140 and the supplementary battery pack 150. Herein, the aerial charging station T can place the fully charged supplementary battery pack 150 at a designated position above the drone. The unmanned vehicle 100 will first approach the aerial charging station T downwards, so that the battery pack 140 and the supplementary battery pack 150 on the aerial charging station T are electromagnetically attracted to each other to form the unmanned vehicle 100B, and then fly upward away from the aerial charging station T. In one embodiment, the unmanned vehicle 100 can load one or more supplementary battery packs 150 through one landing, or one landing and load one supplementary battery pack 150, or multiple landings to load multiple supplementary battery packs 150, depending on demand and without limitation herein. In short, the purpose of long-distance flight can be achieved by first setting up multiple aerial charging stations T on the flight path.

When the power of the supplementary battery pack 150 is greater than the power of the battery pack 140, the supplementary battery pack 150 can charge the battery pack 1400 (or the battery pack 130, or the battery pack 120). Furthermore, when after the battery pack 140 has been loaded and replenished, the body 110 will not only use the power of the supplementary battery pack 150 first, but the supplementary battery pack 150 will also recharge the battery pack 140 above that is not fully charged (or the battery pack 130, or the battery pack 120), so that the power of the battery packs 120, 130, 140 and the supplementary battery pack 150 will always conform to the battery pack 120≥the battery pack 130≥the battery pack 140≥the supplementary battery pack 150.

Figure 5A:
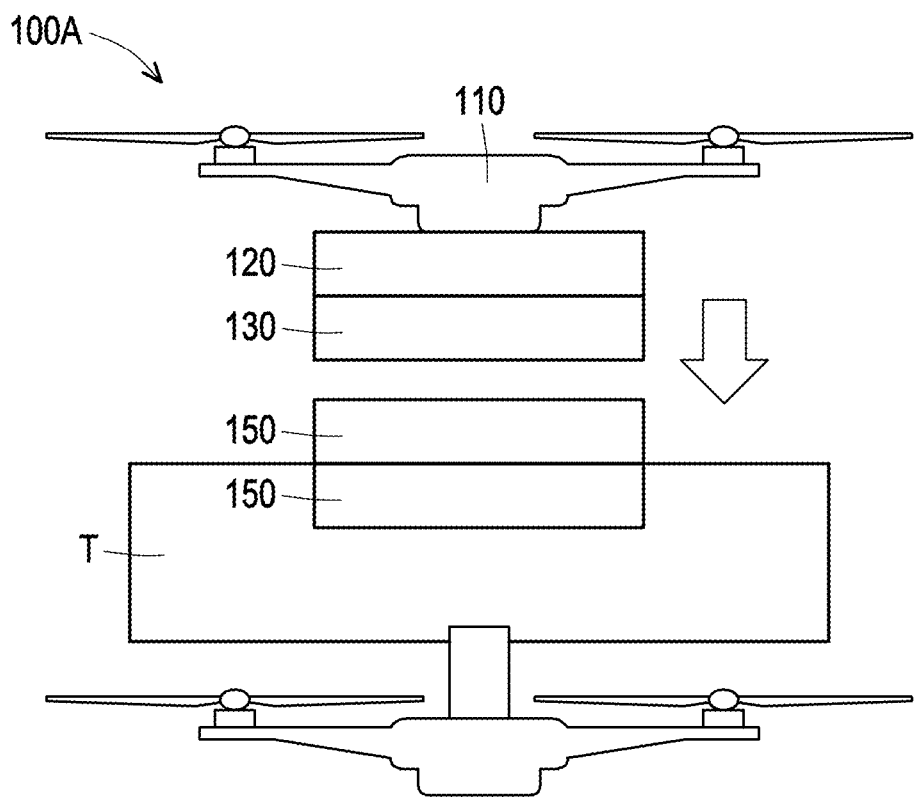
FIGS. 5A and 5B are another schematic diagram of the unmanned vehicle in FIG. 1B during charging.
Figure 5B:
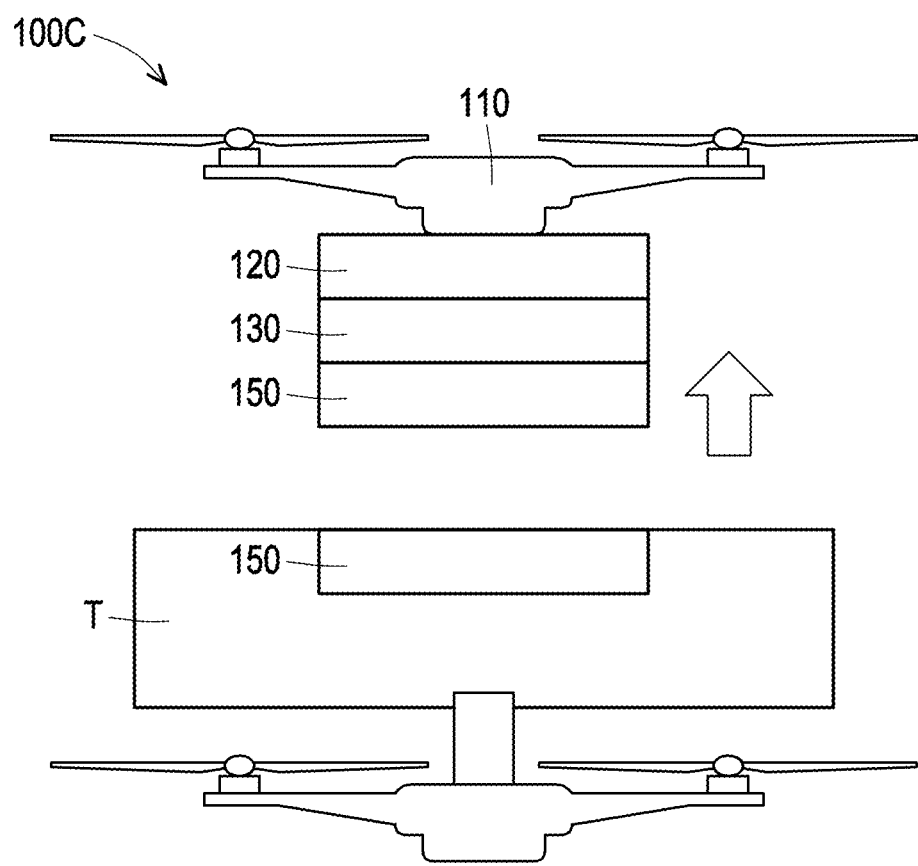

FIGS. 5A and 5B are another schematic diagram of the unmanned vehicle in FIG. 1B during charging. Please refer to FIG. 1B, FIG. 5A and FIG. 5B at the same time. When the unmanned vehicle 100A is in a desired charging state, the battery pack 140 stacked on the body 110 and furthest away from the body 110 can be unloaded to expose the battery pack 130. The battery pack 130 is recharged by electromagnetically attracting at least one supplementary battery pack 150 on an aerial charging station T to be stacked thereon, thereby forming an unmanned vehicle 100C having the battery packs 120, 130 and the supplementary battery pack 150. In other words, the unmanned vehicle 100A can first unload the low-power or exhausted battery pack 140 below, and then approach the aerial charging station T, so that the battery pack 130 and the supplementary battery pack 150 on the aerial charging station T are electromagnetically attracted to each other to form the unmanned vehicle 100C, and then fly upward away from the aerial charging station T, which can achieve the effect of being unloaded as quickly as possible and reducing weight. In one embodiment, the unmanned vehicle 100A can load one or more supplementary battery packs 150 through one landing, or one landing and load one supplementary battery pack 150, or multiple landings to load multiple supplementary battery packs 150, depending on demand and without limitation herein.

When the power of the supplementary battery pack 150 is greater than the power of the battery pack 130, the supplementary battery pack 150 can charge the battery pack 130 (or the battery pack 120). Furthermore, after the battery pack 130 has been loaded and replenished, the body 110 will not only use the power of the supplementary battery pack 150 first, but the supplementary battery pack 150 will also recharge the battery pack 130 above that is not fully charged (or the battery pack 120), so that the power of the battery packs 120, 130 and supplementary battery pack 150 will always conform the battery pack 120≥the battery pack 130≥the supplementary battery pack 150.

Figure 6:
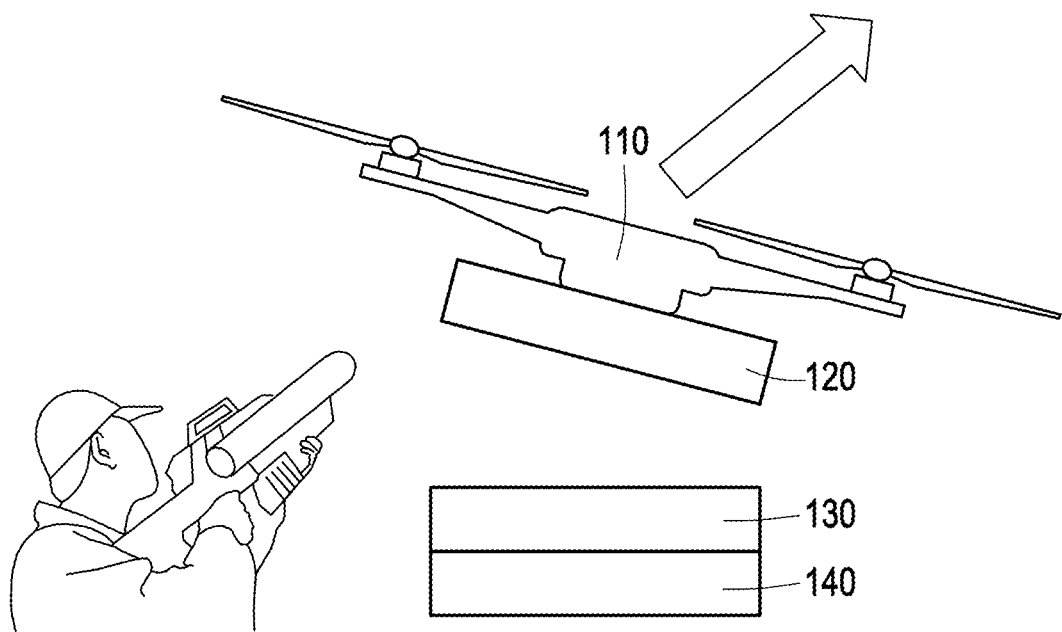
FIG. 6 is a schematic diagram of the unmanned vehicle in FIG. 1A when it encounters an emergency state.

FIG. 6 is a schematic diagram of the unmanned vehicle in FIG. 1A when it encounters an emergency state. Please refer to FIG. 6. In this embodiment, when the unmanned vehicle 100 is in an emergency state, the battery packs 130 and 140 can be unloaded from the body 110 in a demagnetization manner. That is to say, if there is an emergency situation during flight, such as a jamming gun or a capture gun, and the unmanned vehicle 100 needs to make an emergency escape, some of the battery packs 130 and 140 can be unloaded to reduce the weight, so that it can raise the altitude at the fastest speed or escape from the scene at the highest speed. On the other hand, the battery pack 130 and 140 that have been unloaded and fallen can confuse the enemy and achieve the effect of tail-cutting to survive.

To sum up, in the design of the unmanned vehicle of the disclosure, the battery packs are detachably stacked on the body, and the body sequentially uses the power of the battery packs in the anti-gravity direction. Therefore, when the unmanned vehicle takes off, multiple battery packs can be installed, which has the advantage of large battery capacity and long endurance of large battery; on the other hand, since the bottom battery pack can be utilized first, the battery pack that has exhausted its power can be unloaded, which has the advantages of light weight and fast flight speed of the small battery. In short, the unmanned vehicle of the disclosure can combine the advantages of both the large battery and the small battery.

Although the disclosure has been disclosed above through embodiments, they are not intended to limit the disclosure. Anyone with ordinary knowledge in the relevant technical field can make some changes and modifications without departing from the spirit and scope of the disclosure. Therefore, the protection scope of the disclosure shall be determined by the appended patent application scope.

What is claimed is:

1. An unmanned vehicle, comprising:
a body; and
a plurality of battery packs detachably stacked on the body, wherein the body sequentially uses a power of the plurality of battery packs in an anti-gravity direction.

2. The unmanned vehicle according to claim 1, wherein the plurality of battery packs are stacked on the body in an electromagnetically attractive manner, and at least one of the plurality of battery packs is unloaded from the body in a demagnetizing manner.

3. The unmanned vehicle according to claim 2, wherein each of the plurality of battery packs has a first surface and a second surface opposite each other, and each of the plurality of battery packs comprises an electromagnet pack and a magnetic structure pack, the electromagnet pack is disposed on the first surface, and the magnetic structure pack is disposed on the second surface.

4. The unmanned vehicle according to claim 3, wherein each of the plurality of battery packs further comprises a battery management module electrically connected to the electromagnet pack to activate or deactivate a magnetism of the electromagnet pack.

5. The unmanned vehicle according to claim 4, wherein the battery management module of one of the plurality of battery packs activates the magnetism of the electromagnet pack to electromagnetically attract the magnetic structure pack of another of the plurality of battery packs and is stacked on the body.

6. The unmanned vehicle according to claim 4, wherein the battery management module of one of the plurality of battery packs turns off the magnetism of the electromagnet pack to demagnetize the magnetic structure pack of another of the plurality of battery packs and is unloaded from the body.

7. The unmanned vehicle according to claim 2, wherein the magnetic structure pack comprises a plurality of magnets or a plurality of iron sheets.

8. The unmanned vehicle according to claim 2, wherein when the unmanned vehicle is in a desired charged state, a first battery pack of the plurality of battery packs stacked on the body and furthest away from the body is unloaded to expose a second battery pack, and the second battery pack is recharged by electromagnetically attracting at least one supplementary battery pack on a ground charging station to be stacked thereon.

9. The unmanned vehicle according to claim 2, wherein when the unmanned vehicle is in a desired charged state, a battery pack of the plurality of battery packs stacked on the body and furthest away from the body is recharged by electromagnetically attracting at least one supplementary battery pack on a ground charging station to be stacked thereon.

10. The unmanned vehicle according to claim 9, wherein when a power of the at least one supplementary battery pack is greater than a power of the battery pack, the at least one supplementary battery pack charges the battery pack.

11. The unmanned vehicle according to claim 2, wherein when the unmanned vehicle is in a desired charged state, a first battery pack of the plurality of battery packs stacked on the body and furthest away from the body is unloaded to expose a second battery pack, and the second battery pack is recharged by electromagnetically attracting at least one supplementary battery pack on an aerial charging station to be stacked thereon.

12. The unmanned vehicle according to claim 2, wherein when the unmanned vehicle is in a desired charged state, a battery pack of the plurality of battery packs stacked on the body and furthest away from the body is recharged by electromagnetically attracting at least one supplementary battery pack on an aerial charging station to be stacked thereon.

13. The unmanned vehicle according to claim 12, wherein when a power of the at least one supplementary battery pack is greater than a power of the battery pack, the at least one supplementary battery pack charges the battery pack.

14. The unmanned vehicle according to claim 2, wherein when the unmanned vehicle is in an emergency state, the at least one battery pack of the plurality of battery packs is unloaded from the body in a demagnetized manner.

15. The unmanned vehicle according to claim 1, wherein each of the plurality of battery packs has an assembly surface, and one of the plurality of battery packs is stacked on another of the plurality of battery packs in a manner parallel to the assembly surface.

16. The unmanned vehicle according to claim 15, wherein the plurality of battery packs have the same specifications.

17. The unmanned vehicle according to claim 1, wherein each of the plurality of battery packs has a plurality of contacts, and the plurality of contacts of one of the plurality of battery packs are electrically connected to the plurality of contacts of another of the plurality of battery packs.

18. The unmanned vehicle according to claim 1, wherein the plurality of battery packs comprise a first battery pack and at least one second battery pack, the first battery pack is assembled on the body, and the at least one second battery pack is detachably stacked on the first battery pack.

19. The unmanned vehicle according to claim 18, wherein the first battery pack comprises a built-in battery pack, and the at least one second battery pack comprises at least one disposable battery pack.

20. The unmanned vehicle according to claim 1, wherein each of the plurality of battery packs comprises a disposable battery pack.

* * * * *